US005373735A

United States Patent [19]
Gutman

[11] Patent Number: 5,373,735
[45] Date of Patent: Dec. 20, 1994

[54] GEAR TESTING METHOD AND APPARATUS FOR INSPECTING THE CONTACT AREA BETWEEN MATING GEARS

[75] Inventor: Yevsey Gutman, Minneapolis, Minn.

[73] Assignee: GEI Systems, Inc., Minneapolis, Minn.

[21] Appl. No.: 100,115

[22] Filed: Jul. 30, 1993

[51] Int. Cl.$^5$ ............................................ G01M 13/02
[52] U.S. Cl. ............................... 73/162; 33/501.07; 356/23
[58] Field of Search .......... 73/162; 33/501.07, 501.13; 356/23, 394

[56] References Cited

U.S. PATENT DOCUMENTS

| | | |
|---|---|---|
| 1,174,176 | 9/1939 | Journeaux et al. |
| 1,930,273 | 10/1933 | Hutchinson . |
| 3,496,046 | 2/1970 | Lootvoet . |
| 3,952,418 | 4/1976 | Akamatsu et al. ............... 73/162 |
| 4,261,198 | 4/1981 | Moore ............................... 73/162 |
| 4,572,663 | 2/1986 | Greene et al. .................... 356/23 |
| 4,618,256 | 10/1986 | Bartolomeo ...................... 356/23 |
| 4,624,568 | 11/1986 | Bartolomeo ..................... 356/347 |
| 5,083,458 | 1/1992 | DeGeorge et al. ............... 73/162 |
| 5,207,097 | 5/1993 | Gutman ............................ 73/162 |

FOREIGN PATENT DOCUMENTS

| | | |
|---|---|---|
| 0001568 | 1/1980 | Japan ................................ 73/162 |
| 0046228 | 2/1987 | Japan ................................ 73/162 |
| 0100434 | 4/1991 | Japan ................................ 73/162 |
| 0100435 | 4/1991 | Japan ................................ 73/162 |
| 404036632 | 2/1992 | Japan ................................ 73/162 |

OTHER PUBLICATIONS

Advertisement, IK-M40A Color Camera, Toshiba America C.P., Inc. (No date).
Advertisement, VH-6100 Portable Monitor Microscope, Marsland Associates, Inc., Cat. No. VH3, (No date).
Advertisement, CPD Cameras WV-CD10, Panasonic Audio-Video Systems Division (1983).
Advertisement, XC-37 Miniature CCD Video Camera Module, Sony Corporation (No date).
Advertisement, XC-999/999P CCD Color Camera Module, Sony Corporation (No Date).
Advertisement, Autovision 90 Machine Vision, Automatic Nov. 18, 1991.
Advertisement, "Computer Vision", Southwest Research Institute (No date).
Advertisement, "Lapping Machines", Gleason Works, p. 21 (No date).
Advertisement, "Automated Marking Compound Spray System", Gleason Works, pp. 4–5 (No date).
Advertisement, Synchrolux Model ALS-12000S Fiber-optic Strobe Light Source, Olympus Industrial (No date).
Advertisement, Modular Angle Encoder ERA 150/ERA 180 of Heidenhain Corporation (No date).

*Primary Examiner*—Diego F. F. Gutierrez
*Attorney, Agent, or Firm*—Westman, Champlin & Kelly

[57] ABSTRACT

A gear tester method and apparatus for inspecting a contact area between a gear member, such as a spiral bevel or hypnoid gear, relative to a second gear, such as a pinion. The gear tester includes a spray system for coating a portion of the gear member with a gear marking compound, such that when the pinion contacts the gear member the gear marking compound provides an indication or footprint of tooth contact made between the gear member and the pinion. A strobing device illuminates the gear member for inspecting the footprint while the gears are still rotating. In a preferred embodiment, a sensing device senses images of the footprint and a display device displays the sensed images whereby the gear mesh is non-invasively inspected.

21 Claims, 3 Drawing Sheets

5,373,735

GEAR TESTING METHOD AND APPARATUS FOR INSPECTING THE CONTACT AREA BETWEEN MATING GEARS

BACKGROUND OF THE INVENTION

The present invention relates generally to a gear tester used for testing the quality of meshing between mating gears, and more particularly, to a gear tester method and apparatus for inspecting the contact area between mating gears under different mounting positions of the gears while the gears are rotating.

In the prior art, it has long been the practice to visually inspect the shape, size and orientation of the contact area between the mating teeth of two gears, for example a gear member and a pinion, by driving the gear member with the pinion (usually under light load) with the gear tooth surfaces covered with a thin layer of paint. As the paint is removed from portions of each gear tooth surface due to contact from a corresponding tooth of the pinion, a "footprint" of the contact region remains visible on the contacting tooth surface of the gear member.

The main problem associated with this process is that in order to observe the footprint, the gear tester had to be stopped and visually inspected every time a new mounting position between the gear member and pinion was used. Since the gear tester had to be stopped, it became customary either to remove the old paint from the teeth surfaces by rubbing the gear member clean or to respray the teeth surfaces. The pinion or gear member mounting position would then be changed to obtain a new set of footprints. The constant stopping, inspecting and respraying process added substantial time to the testing runs. In addition, a detailed record of the test results for each run was difficult to maintain.

SUMMARY OF THE INVENTION

The present invention relates to a gear testing method and apparatus for inspecting a contact area between selected tooth surfaces of a gear member, such as a spiral bevel or hypoid gear, relative to selected gear tooth surfaces of a second gear, such as a pinion. The gear tester includes a coating device for coating the gear member with a material such that when teeth of the pinion contact teeth of the gear member the material forms a footprint representative of the contact area formed between the teeth of each of the gears. A strobing device is adjusted to illuminate one of the gears for inspecting the footprint thereon while the gears are still rotating.

In a preferred embodiment, a camera is adjusted to receive images of the footprint of the illuminated gear, and provides output signals representing the footprint to a monitor for displaying the footprint and/or to an image processing device and associated computer terminal for analysis thereof.

Although the present invention will be described with respect to a hypoid or spiral bevel gear tester, principals forming the present invention are equally suited for testing other types of gears. Therefore, it is to be understood that the present invention is not limited to nor intended to be limited to a gear tester for hypoid or spiral bevel gears.

DETAILED DESCRIPTION OF THE PREFERRED EMBODIMENTS

Figure 1:
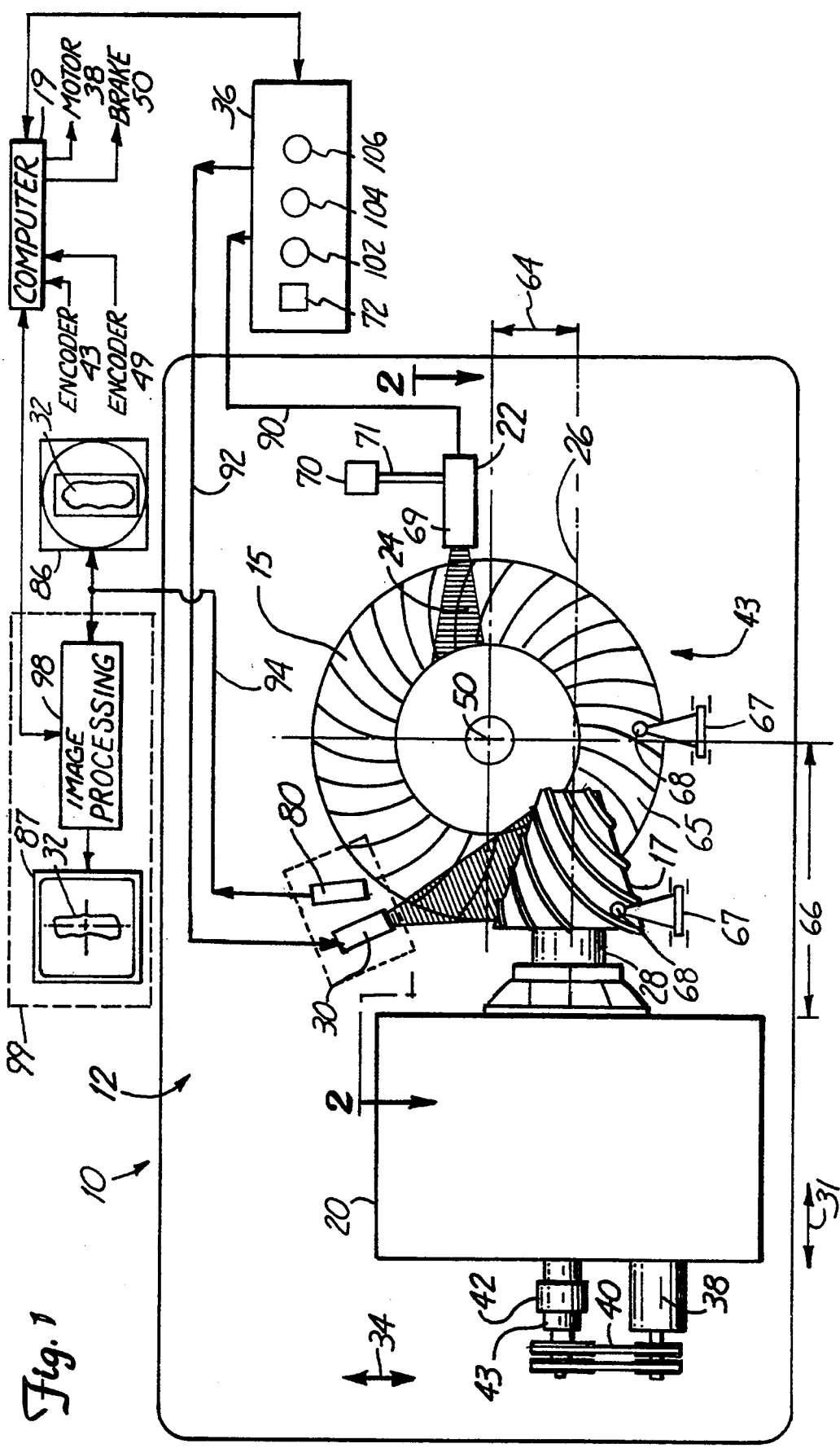
FIG. 1 is a schematic top plan view of the gear tester of the present invention.
Figure 2:
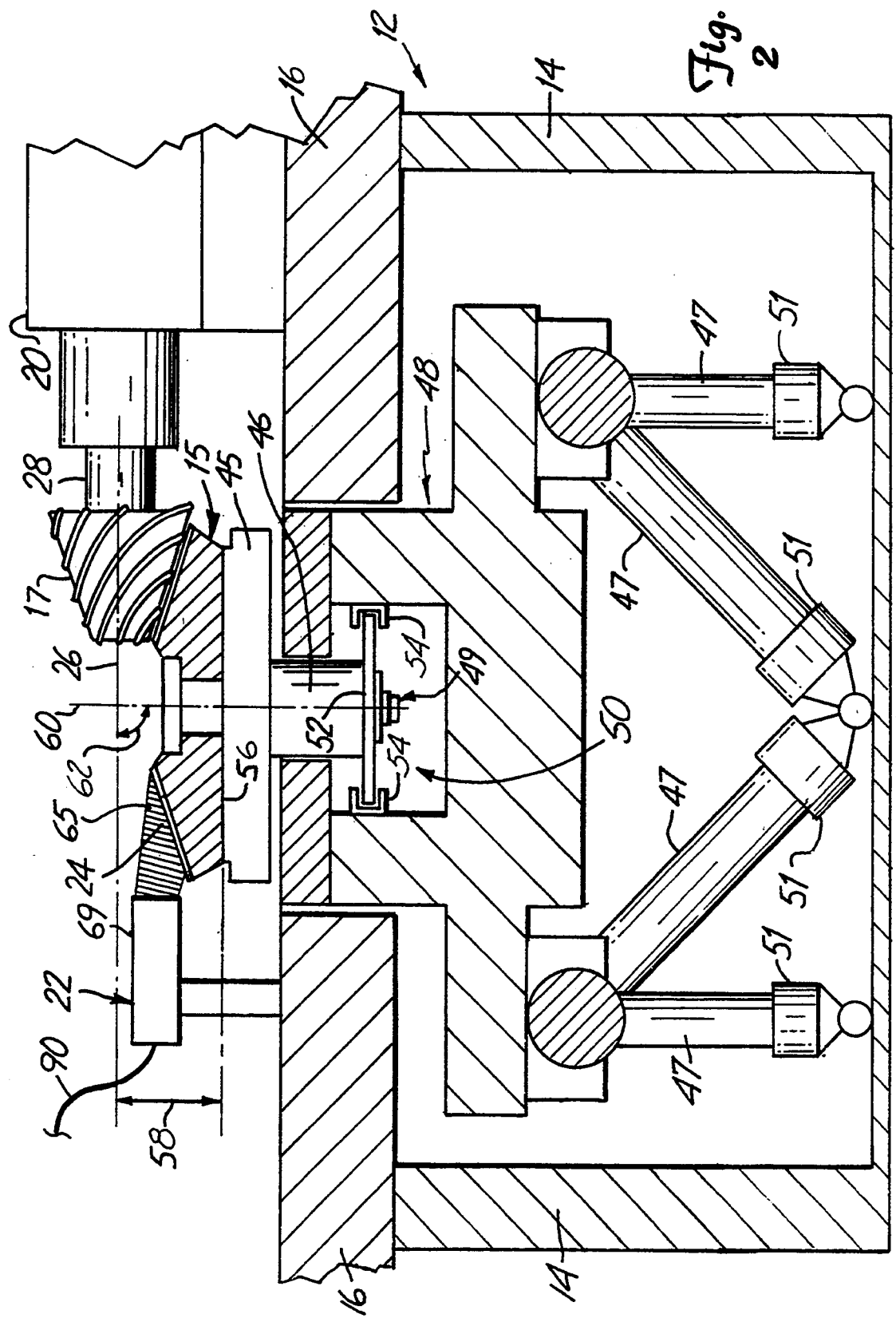
FIG. 2 is a sectional view of the gear tester taken generally along line 2—2 of FIG. 1, but rotated 180° about the ring gear axis.

Referring to FIGS. 1 and 2, a gear tester of the present invention is illustrated generally at 10. A support frame 12 includes a base (not shown), upright walls 14 attached to the base, and a table 16 mounted on the walls 14.

The gear tester 10 is used to analyze the quality of meshing between teeth of a gear member 15 and teeth of a second gear, commonly called a pinion 17. As illustrated in FIGS. 1 and 2, the teeth of the gear member 15 (a spiral bevel or hypoid gear) are engageable with the teeth on the pinion 17 for driving the gear member 15. The gear member 15 is mounted to the frame 12 for rotation about a central axis 60. The pinion 17 is connected to a pinion spindle 28 which is mounted in a pinion housing 20 for rotation about an axis 26. A spray system 22 selectively coats the teeth of the gear member 15 with a gear marking compound 24 such as a removable paint. A strobe light 30 illuminates a portion of the rotating gear member 15 so that a footprint 32 (see FIG. 3) formed on each tooth of the gear member 15 can be inspected while the gear member 15 and pinion 17 are still rotating. The footprint 32 represents the area of contact made between corresponding teeth of the gear member 15 and the pinion 17. A control system 36 controls the activation and deactivation of the spray system 22 and the synchronization of the frequency of the strobe light 30 with the rotation of the gear member 15. A computer 19 controls the speed of rotation of the gear member 15 and pinion 17 as described in my U.S. Pat. Nos. 5,207,097, 5,224,377 and 5,307,676, which are hereby incorporated by reference.

The pinion housing 20 is supported on the table 16 and permits movement of the pinion 17 along two mutually perpendicular axes, represented by arrows 31 and 34, in a plane parallel to an upper surface of the table 12. Movement of the pinion 17 in this manner permits coarse setting of the pinion 17 with respect to the gear member 15. A suitable motor 38 is mounted in pinion housing 20 and drives a pulley and belt drive 40 to rotate a shaft 42 that is coupled to pinion spindle 28 and thus drives the pinion 17. The motor 38 has adequate power to load both the pinion 17 and the gear member 15. Other types of spindles, including my spindle described in my co-pending application Ser. No. 08/100,114, entitled ADJUSTABLE SPINDLE filed on even date herewith and which is hereby incorporated by reference, could also be used.

A conventional optical shaft speed encoder 43, positioned on the pinion spindle 28, provides the rotational speed and home position of the pinion 17 for controlling gear meshing. The optical encoder 43 is of known construction and includes an incremental track (not shown)

having a series of parallel lines thereon which are optically scanned to provide a series of pulses indicative of the relative position of the pinion 17 and of the time between lines and hence of the speed of pinion 17. The optical encoder 43 also includes a reference track (not shown) which has a single line thereon indicative of the home position. The encoder 43 provides signals corresponding to the speed and the relative and home positions of the pinion 17 to the computer 19. The home position establishes a reference point for determining the position of the pinion 17 with respect to the gear member 15.

Referring to FIG. 2, the gear member 15 includes a gear base 45 which is mounted to a gear spindle 46 in a suitable manner. The gear spindle 46 is mounted in a gear carriage 48 using suitable bearings. The gear carriage 48 is independent of the frame 12, but is supported relative thereto, and in this instance the gear carriage 48 is supported with six degrees of freedom relative to the fixed position of the pinion 17 using actuators 51 and rods 47, schematically illustrated. The detailed construction of different gear carriages 48 and associated support systems have been fully described in my U.S. Pat. Nos. 5,207,097; 5,129,389; 5,224,377 and 5,307,676 which are hereby incorporated by reference.

An optical encoder, indicated schematically at 49 in FIGS. 1 and 2, indicates the rotational speed and home position of the gear member 15 for controlling gear meshing. The optical encoder 49 is shown positioned in the gear carriage 48 on the gear spindle 46 and is of the same construction and operation as the encoder 43 on the pinion 17.

In the embodiment illustrated, the spindle 46 further includes a brake assembly 50 which comprises a brake disc 52 and calipers 54 which are used to place loads on the gear member 15 and pinion 17. Feedback signals from sensors (not shown) in the gear carriage 48, the encoder 43 and the encoder 49 are provided to the computer 19 for placing loads on the gear member 15 and pinion 17 through the brake assembly 50 and/or for adjusting the speed of the gear member 15 and pinion 17 through motor 38, as well as for adjusting the position of the gear member 15 and pinion 17 relative to each other using actuators 51, connected to the carriage 48 with rods 47.

Referring to FIGS. 1 and 2, the gear member 15 has a gear axis 60 which is the center of the gear spindle 46 and which is offset from the pinion axis 26. A back surface 56 of gear member 15 is mounted by a distance represented by arrow 58 from the pinion axis 26. The distance indicated by the arrow 58 is commonly known as the gear mounting distance. An angle, indicated by arrow 62, between the gear axis 60 and the plane containing the pinion axis 26 is commonly known as the shaft angle. The distance indicated by arrow 64, reflects the offset of the pinion axis 26 relative to the gear axis 60 and is typically referred to as the "V" position or hypoid offset. The distance indicated by arrow 66, reflects the distance of the gear axis 60 from a reference plane on the pinion housing 20 and is typically referred to as the "H" position. The gear distance 64, shaft angle 66, H position and V position of the pinion 17 along axes 31 and 34 are varied by movement of the gear carriage 48 and pinion housing 20. The details regarding coarse and nominal settings of the gear distance 58, shaft angle 62, V position and H position have been fully described in my U.S. Pat. No. 5,307,676 which is hereby incorporated by reference. Adjusting the gear distance 58, shaft angle 62, H position 64 and V position 66 through movement of the gear member 15 or the pinion 17 changes the size, shape and location of the footprint 32. In the embodiment illustrated, the mounting positions are adjustable while the gears are rotating such that different footprints 32 may be observed without stopping the machine at all.

The gear member 15 and the pinion 17 each have a locating pin 67 operable therewith for aligning the teeth of the gear member 15 with the teeth of the pinion 17. Each locating pin 67 is of conventional construction and is pivotally mounted to the frame 12 such that the locating pin 67 is engageable with and disengageable from the respective gear. Each locating pin 67 includes a ball 68 which fits between adjacent teeth to fix the position of the respective gear member 15 or pinion 17 to prevent misalignment while the gear member 15 and pinion 17 are mated together.

Still referring to FIGS. 1 and 2, the spray system 22 selectively coats outer surfaces 65 of the teeth of the gear member 15 with the gear marking compound 24, which is then removed due to contact with teeth on the pinion 17 to form the footprint 32 on each tooth of the gear member 15. The spray system 22 includes a spray gun 69 having a nozzle for spraying the marking compound 24, a container 70 for storing the marking compound 24, and a hose 71 connecting the container 70 to the spray gun 69. The positioning of the spray gun 69 may vary so long as the marking compound 24 is disposed across substantially the entire width of the teeth of the gear member 15. The spray system 22 is easily adjusted for flow and direction to accommodate various size gears. The spray gun 69 is activated and deactivated by a first control signal along signal line 90 from the control system 36 to selectively apply marking compound 24 to the gear member 15. For instance, the spray system 22 can be activated to apply marking compound 24 to every tooth on the gear member 15. Alternatively, the spray system 22 can be activated and synchronized to apply marking compound 24 to only a selected set of teeth or a particular tooth of the gear member 15. An operator activates the spray gun 67 by a control switch 72 on the control system 36. The spray system 22 is commercially available as an optional accessory from The Gleason Works. Rochester, N.Y.

The strobe light 30 illuminates a selected portion of one of the gears, as illustrated the teeth on the gear member 15, in order to inspect the footprint 32 while the gear member 15 and pinion 17 are rotating. The strobe light 30 is activated and deactivated by a second control signal along signal line 92 from the control system 36.

A charge coupled device (CCD), solid state image sensor or camera 80 positioned adjacent to the strobe light 30 receives a reflection of the illuminated tooth when the strobe light 30 is activated and thus receives an image of the footprint 32. The camera 80 provides a signal representative of the footprint 32 on a signal line 94. The camera 80 is commercially available such as, for example, Models XC-999/999P and XC-37 manufactured by Sony Corporation of America, Park Ridge, N.Y. The anti-magnetic properties of a CCD allows the camera to be used in areas with strong magnetic fields and since the motor 38 and other machinery creates magnetic fields within the gear tester 10, a CCD camera is preferred. Preferably, the camera 80 and strobe 30 are enclosed in a single housing such as the Synchrolux Model ALS-120005 fiberoptic strobe light source commercially available from Olympus Corporation, Lake Success, N.Y.

Figure 3:
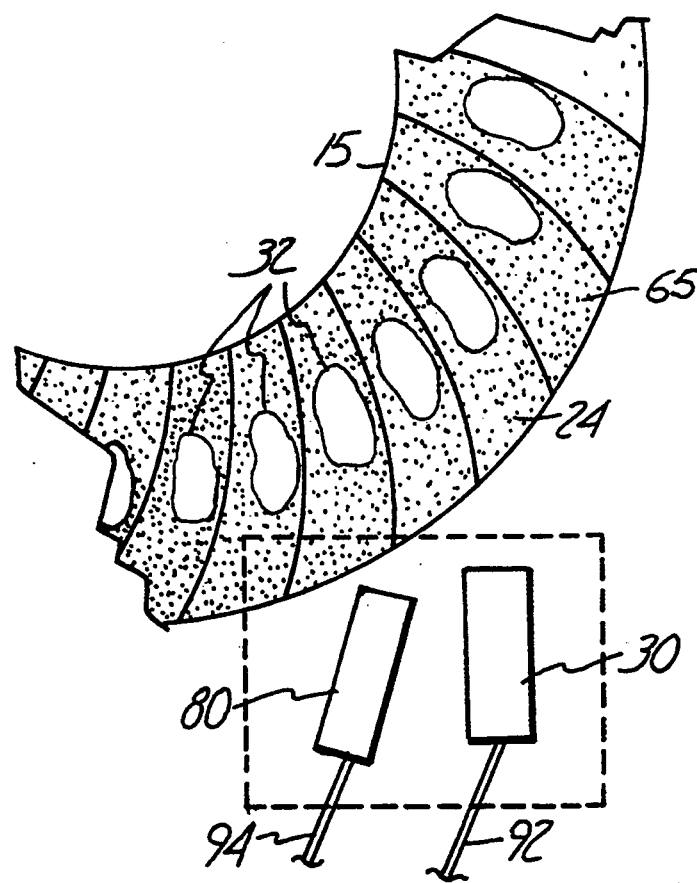
FIG. 3 is an enlarged perspective view of the gear member illustrating gear member tooth contact area footprints thereon.

FIG. 3 illustrates typical footprints 32 on the outer surface 65 of the gear member 15. The footprints 32 represent the area on the outer surface 65 of each tooth of the gear member 15 which contacts the mating teeth of the pinion 17. The size, shape and orientation of the footprint 32 indicates the quality of the gear mesh under the current mounting conditions. The term "quality" means the location and size of the contact area in respect to the preferred or theoretical design location and size of the footprint, and also the subjective basis of the lowest noise made by the gears as they rotate. Since the mounting positions of the gear member 15 and pinion 17 are adjustable while the gears are rotating, and since the spray system 22 may be operated while the gears are rotating, various footprints 32 may be observed in substantially shorter time than was previously possible.

Referring to FIG. 1, a display screen 86 displays the camera 80 output signal. In an embodiment of the present invention, an operator can thus examine the footprint 32 of the mating gears remotely and safely.

Figure 4:
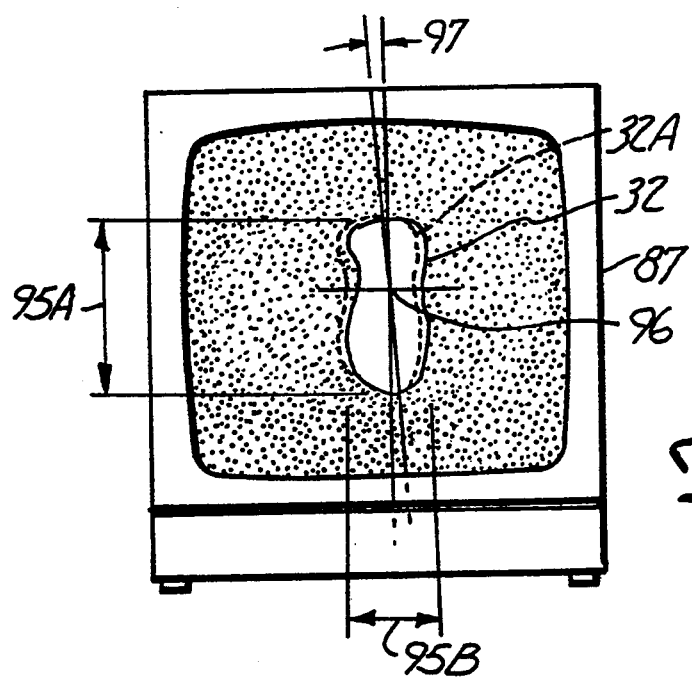
FIG. 4 is an enlarged view of a computer monitor showing a gear member tooth contact area footprint thereon.

In a further preferred embodiment of the present invention, an analysis system 99 is included. The analysis system 99 comprises an image processor 98 and a computer monitor 87 that displays the image of either a single footprint 32 or, preferably, superimposes the images of successive or selected footprints 32. Several footprints 32A or frames are shown in FIG. 4 in dashed lines superimposed on each other while the solid-lined footprint 32 represents the statistical distribution of the average contact area. If the monitor 87 is refreshed frequently or set to process every footprint frame, then the footprint 32 will appear to move on the monitor 87.

The image processor 98 receives the output signal of the camera 80 along signal line 94 and processes the image signal using known processing techniques for digitizing the signal that includes pixel counting, connectivity, gray scale, edge detection, normalized correlation, Hough transform, mathematical morphology and local convolution. It is important that the image processor 98 digitize each footprint image such that the image is displayed in pixel format on the monitor 87 and such that a data file may be created for analysis of the images. The results are displayed on the computer monitor 87 and include determinations of such parameters as the overall dimension 95A and 95B which approximate the length, width and shape of the footprint 32, the location of the center 96 of the footprint 32, and the skewness 97 which approximates an offset angle of the footprint 32 in relation to a particular tooth of the gear member 15. Preferably, these parameters are of the average contact area determined from a number of images corresponding to different selected teeth; however, if desired, these parameters can be of a single contact area corresponding to a particular tooth.

Analysis of the parameters of the footprints 32 or of successive footprints establishes both the effect of various loads on the gear interface after loading and the desired interface prior to loading. The image processor 98 can be circuitry on a board in the computer 19 or a separate unit, as shown, connected to the computer 19. The image processor 98 provides tooth contact analysis information feedback to the monitor 87 for displaying images of the footprint 32. The image processor 98 is commercially available, for example, from Automatrix, Inc., Billerica, Mass. and includes software and hardware for digital analysis of the displayed footprint image 32. Successive footprint images 32 may be sequenced and analyzed using processing techniques provided by the image processor 98 or by custom developed processing techniques.

Referring again to FIG. 1, an operator or the computer 19 controls activation and deactivation of the spray gun 67 via the first control signal along line 90 and the frequency and phase of the strobe light 30 via the second control signal along line 92. The spray gun 67 is usually activated to coat the entire top surface 65 of the gear member 15 prior to analysis of each new mounting position or condition. However, for some situations the spray gun 67 may be controlled to coat only a portion of the top surface 65 and the strobe light 30 synchronized to illuminate only those coated portions. The computer 19 can include "expert system" programming wherein full or partial automation of the gear tester system 10 would be done automatically. For example, the computer 19 could determine location of the footprint on the teeth surfaces for a particular run, determine if location should be changed.

The ability of the strobe light 30 to illuminate a particular tooth or teeth on the gear member 15 depends on the following factors: the number of teeth (N) on the gear member 15, the number of teeth to skip ($X_n$) between successive strobe flashes, and the phase ($\Phi$) of the strobe 30. The number of teeth (N) on the gear member is used to determine the meshing frequency which is the number of strobes per revolution to view every tooth on the gear member 15. The number of teeth to skip ($X_n$) between strobes is used to view a particular tooth arrangement. By changing the value of $X_n$, the "contrast" of the image is controlled such that the higher the frequency (i.e., a lower value of $X_n$) the sharper the image as well as the number of teeth to be used for determining the average contact area. The number of teeth (N) and number of teeth to skip ($X_n$) are input variables to the control system 36 by knobs 102 and 104, respectively, and are determined by the gear member 15 and pinion 17 under test. The phase ($\Phi$) of the strobe 30, which is in essence a time shift of the strobe control signal 92 is used to initiate the strobe flash and to permit the operator to fine tune an image of the footprint 32. For instance, due to the positioning of the camera 80 relative to the gear member, illumination of the desired gear tooth may not be optimum for reflection back to the camera 80. In other words, the phase shift ($\Phi$) provides a slight time delay so that the gear tooth will be in an optimum position for viewing by the camera 80.

In order to avoid stopping the gear member 15 and manually wiping the paint 24 from the top gear surface 65, one of several methods may be employed. For instance, the paint 24 may be magnetic such that it can only be applied to the outer tooth surfaces 65 of the gear member 15 when the gear member 15 is magnetized with an opposite polarity, thereby attracting the paint 24. By reversing the polarity of the gear member 15 the paint 24 is repelled from the top surface 65 such that a new coat can be applied.

Other methods are available to avoid stopping and manually wiping the gear member 15 and pinion 17 between mounting conditions. For instance, specially designed wipers (not shown) may be installed in space near the gear/pinion contact area, or the paint 24 may be designed such that it is removable by an air jet. In the preferred embodiment, the paint 24 is not removed; rather, the gear member 15 is simply resprayed with new paint. The contact between the gear member 15 and pinion 17 is sufficient to remove both old and new paint to develop the contact area. The gear marking compound is commercially available as Type B-201YP, which is produced by Wayne Chemical Co., Detroit, Mich.

The ability of the present gear tester 10 to permit continuous observation of footprints representing different gear mounting positions without having to stop the gears to change gear mounting positions or to clean and respray the gear member 15 with a gear marking compound 24 or to observe a footprint, provides significant time savings compared to previous footprint analysis apparatus and techniques. The gear tester 10 includes a strobe light 30 and a spray system 22 which are controlled by the operator or a computer to permit viewing the footprint 32 while the gears are still rotating, and respraying of the gear member 15 after mounting positions have been changed so that once the gear tester 10 is activated, extensive analysis, which could employ computer expert systems, can take place without stopping the gears.

Although the present invention has been described with reference to preferred embodiments, workers skilled in the art will recognize that changes may be made in form and detail without departing from the spirit and scope of the invention.

What is claimed is:

1. A gear inspection apparatus for inspecting a contact area formed between corresponding teeth of two rotating and meshing gears, the apparatus comprising:
    a frame
    means for rotatably mounting a first gear and a second gear to the frame wherein one of the gears drives the other gear;
    spray means for coating a portion of the second gear with a gear marking compound such that when the first gear meshes with the second gear the gear marking compound provides an indication of the contact area; and
    strobe means for illuminating a portion of the second gear for inspecting the indication of the contact area while the first and second gears are rotating.

2. The apparatus of claim 1, further comprising sensing means for sensing the indication of the contact area and providing an output signal representing the contact area.

3. The apparatus of claim 2, further comprising display means connected to the sensing means for receiving the output signal and displaying a representation of the contact area while the first and second gears are rotating.

4. The apparatus of claim 2, further comprising an image processor connected to the sensing means for receiving the output signal, the image processor analyzing parameters of the contact area.

5. The apparatus of claim 4, wherein the parameters include a length, width, center and skewness of the contact area.

6. The apparatus of claim 4, wherein the strobe means illuminates at least two different teeth of the second gear, each of the teeth having an indication of the contact area thereon; and wherein the image processor receives the corresponding output signals for each indication of the contact area and determines an average contact area.

7. The apparatus of claim 1, and further comprising means for adjusting the position of the first gear relative to the second gear to change a parameter of the contact area.

8. The apparatus of claim 7, further comprising control means for generating a spray signal to control activation of the spray means such that the spray means is activated when a new position of the first gear relative to the second gear has been obtained and while the gears are rotating.

9. The apparatus of claim 1, further comprising control means for generating a strobe signal to control the synchronization of the strobe means to the rotation of the second gear.

10. The apparatus of claim 9, wherein the strobe signal is determined as a function of the total number of teeth on the second gear.

11. The apparatus of claim 10, wherein the strobe signal is further determined as a function of the number of teeth to skip between successive strobes.

12. The apparatus of claim 9 wherein the control means includes means for adjusting illumination of a selected tooth on the second gear.

13. The apparatus of claim 9 and an encoder mounted to a rotating shaft of the second gear, the encoder providing an output signal to the control means representing a parameter of the rotating second gear.

14. The apparatus of claim 13 wherein the output signal represents a speed of rotation of the second gear.

15. The apparatus of claim 13 wherein the output signal represents a rotational position of the second gear.

16. A method for inspecting a contact area formed between corresponding teeth of a first gear and teeth of a second gear, the method comprising the steps of:
    meshing the teeth of the first gear with the teeth of the second gear at a desired mounting position;
    spraying a gear marking compound on a portion of the teeth of at least one of the gears;
    rotating the first gear and the second gear such that the gear marking compound is formed on the second gear indicating the contact area between the teeth of the first and second gears; and
    illuminating a portion of the second gear with a strobe device such that the contact area is visible while the first gear and second gear are rotating.

17. The method of claim 16, and further including the step of changing the mounting position of the first gear relative to the second gear while the gears are rotating to change a parameter affecting the contact area.

18. The method of claim 16, wherein the illuminating step includes synchronizing the strobing device with the second gear.

19. The method of claim 16, further comprising the step of displaying the gear marking compound indicating the contact area on a screen for analysis thereof.

20. The method of claim 16, further comprising the step of sensing the gear marking compound indicating the contact area and generating an electronic signal representative of the contact area.

21. The method of claim 20 further comprises the steps and further comprises the steps of providing the electrical signal representative of the contact area to an image processor and analyzing parameters of the contact area using the image processor.

* * * * *

UNITED STATES PATENT AND TRADEMARK OFFICE
CERTIFICATE OF CORRECTION

PATENT NO. : 5,373,735
DATED : December 20, 1994
INVENTOR(S) : Yevsey Gutman

It is certified that error appears in the above-indentified patent and that said Letters Patent is hereby corrected as shown below:

Column 8, lines 61-62, delete "further comprises the steps"; and

Column 8, line 62, delete "steps" and insert --step--.

Signed and Sealed this

Seventh Day of March, 1995

Attest:

BRUCE LEHMAN

Attesting Officer      Commissioner of Patents and Trademarks